United States Patent
Stevens et al.

(10) Patent No.: US 8,486,161 B2
(45) Date of Patent: Jul. 16, 2013

(54) LIGNIN UPGRADING FOR HYDROPROCESSING TO BIOFUEL

(75) Inventors: James F. Stevens, Katy, TX (US); William Lawrence Schinski, San Rafael, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 1027 days.

(21) Appl. No.: 12/335,649

(22) Filed: Dec. 16, 2008

(65) Prior Publication Data

US 2010/0146847 A1 Jun. 17, 2010

(51) Int. Cl.
*C10L 1/18* (2006.01)
*C10L 5/20* (2006.01)
*C07G 1/00* (2006.01)
*C08H 7/00* (2011.01)
*C08L 97/00* (2006.01)

(52) U.S. Cl.
USPC .................. 44/443; 44/578; 530/503

(58) Field of Classification Search
USPC ............. 44/605, 443, 578; 530/503
See application file for complete search history.

(56) References Cited

U.S. PATENT DOCUMENTS

| 4,992,605 A | 2/1991 | Craig et al. |
| 6,630,066 B2 | 10/2003 | Cash et al. |
| 6,841,063 B2 | 1/2005 | Elomari |
| 2003/0115792 A1* | 6/2003 | Shabtai et al. ................ 44/605 |
| 2009/0288337 A1* | 11/2009 | Picataggio et al. ............ 44/449 |

OTHER PUBLICATIONS

Huber et al., "Synthesis of Transportation Fuels from Biomass: Chemistry, Catalysts, and Engineering," Chem. Rev., vol. 106, pp. 4044-4098, 2006.
McKendry, "Energy production of biomass (part 1): overview of biomass," Bioresource Technology, vol. 83, pp. 37-46, 2002.
Rana et al., "A Review of Recent Advances on Process Technologies for Upgrading of Heavy Oils and Residua," Fuel, vol. 86, pp. 1216-1231, 2007.
Sun et al., "Hydrolysis of lignocellulosic materials for ethanol production: a review," Bioresource Technology, vol. 83, pp. 1-11, 2002.
Wright, "Ethanol from biomass by enzymatic hydrolysis," Chem. Eng. Prog., vol. 84(8), pp. 62-74, 1988.

* cited by examiner

*Primary Examiner* — James Goloboy
*Assistant Examiner* — Latosha Hines
(74) *Attorney, Agent, or Firm* — Edward T. Mickelson; Tiffany E. Weksberg

(57) ABSTRACT

The present invention is generally directed to methods for processing lignin-containing biomass so as to render it more amenable to hydroprocessing, wherein such processing typically reduces the level of oxygen in the biomass. Following such processing, the resulting reduced-oxygen lignin-derived product can be hydroprocessed into a biofuel suitable for use as a transportation fuel. Additionally, in some embodiments, such methods can be integrated with one or more other processes, wherein such other processes can be production and/or logistical in nature.

25 Claims, 5 Drawing Sheets

Table 1. CHNO determination at each process step

| | Untreated Sorghum | Pretreatment Solid Residue | Enzymatic Hydrolysis Solid Residue | Reduced Oxygen Lignin-Derived Product |
|---|---|---|---|---|
| Carbon (wt%) | 53.1 | 58.5 | 66.4 | 73.2 |
| Hydrogen (wt.%) | 6.8 | 6.8 | 6.6 | 6.9 |
| Nitrogen (wt.%) | 1.7 | 1.3 | 0.4 | 0.2 |
| Oxygen (wt.%) | 38.4 | 33.4 | 26.6 | 19.6 |
| Ash (wt.%) | 7.9 | 8.6 | 10.8 | 12.7 |

Fig. 4

LIGNIN UPGRADING FOR HYDROPROCESSING TO BIOFUEL

FIELD OF THE INVENTION

This invention relates generally to methods for processing lignin-containing biomass into usable products, and specifically to methods for processing lignin-containing biomass to reduce oxygen and render it more amenable to hydroprocessing.

BACKGROUND

Many methods have been suggested for utilizing biofuel for energy production in order to compensate for at least a portion of the fossil fuel currently used in such energy production, and thereby also decrease net $CO_2$ emissions in the overall energy production cycle. See, e.g., Huber et al., "Synthesis of Transportation Fuels from Biomass: Chemistry, Catalysts, and Engineering," Chem. Rev., vol. 106, pp. 4044-4098, 2006.

Unfortunately, biofeedstocks are generally considered to be low energy fuels, and not easily utilized for energy production. The high oxygen and corresponding low energy content of biomass renders it generally inadequate for high-efficiency production of energy, such as high-temperature, high-pressure steam or electricity. Additionally, non-uniformity in the raw material (i.e., biomass), differences in its quality, and other similar hard-to-control variations, may cause problems in an energy production cycle that relies heavily on such fuel. See, e.g., McKendry, "Energy production of biomass (part 1): overview of biomass," Bioresource Technology, vol. 83, pp. 37-46, 2002.

In view of the foregoing, methods that can enhance the efficiency of biofuel production by reducing the oxygen content of biomass and/or symbiotically-integrating the production of biofuel with other non-biofuel producing processes, would be a notable advance in economically-favorable biofuel production.

BRIEF DESCRIPTION OF THE INVENTION

The present invention is generally directed to methods for processing lignin-containing biomass so as to render it more amenable to hydroprocessing, wherein such processing typically reduces the level of oxygen in the biomass. Following such processing, the resulting reduced-oxygen lignin-derived product can be hydroprocessed into a biofuel suitable for use as a transportation fuel. Additionally, in some embodiments, such methods can be integrated with one or more other processes, wherein such other processes can be production and/or logistical in nature.

In some embodiments, the present invention is directed to one or more methods comprising the steps of: (a) providing a quantity of biomass, said biomass comprising a lignin fraction and a holocellulosic fraction; (b) processing the biomass so as to obtain a lignin-rich intermediate, wherein the lignin-rich intermediate comprises a lignin component and a holocellulosic component, wherein the holocellulosic component accounts for not more than 50 weight percent of the lignin-rich intermediate; and wherein the weight percent of the holocellulosic component in the lignin-rich intermediate is less than the weight percent of the holocellulosic fraction in the biomass; and (c) subjecting at least a portion of the lignin-rich intermediate to a high-temperature hydrolysis so as to yield a reduced-oxygen lignin-derived product, wherein said high-temperature hydrolysis is carried out at a temperature of from at least about 220° C. to at most about 300° C., and wherein said reduced-oxygen lignin-derived product has an oxygen content of not more than 25 weight percent on an ash-free basis.

In some or other embodiments, the present invention is directed to one or more methods comprising the steps of: (a) providing a quantity of lignin-containing biomass, said biomass comprising an oxygen content of not less than 30 weight percent on an ash-free basis; and (b) subjecting at least a portion of the lignin-containing biomass to a high-temperature hydrolysis so as to yield a reduced-oxygen lignin-derived product, wherein said high-temperature hydrolysis is carried out at a temperature of from at least about 220° C. to at most about 300° C., and wherein said reduced-oxygen lignin-derived product has an oxygen content of not more than 25 weight percent on an ash-free basis.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 depicts CHNO test results, in tabularized form, from the processing of a lignin-containing sorghum feedstock, in accordance with some embodiments of the present invention.

DETAILED DESCRIPTION OF THE INVENTION

Figure 1:
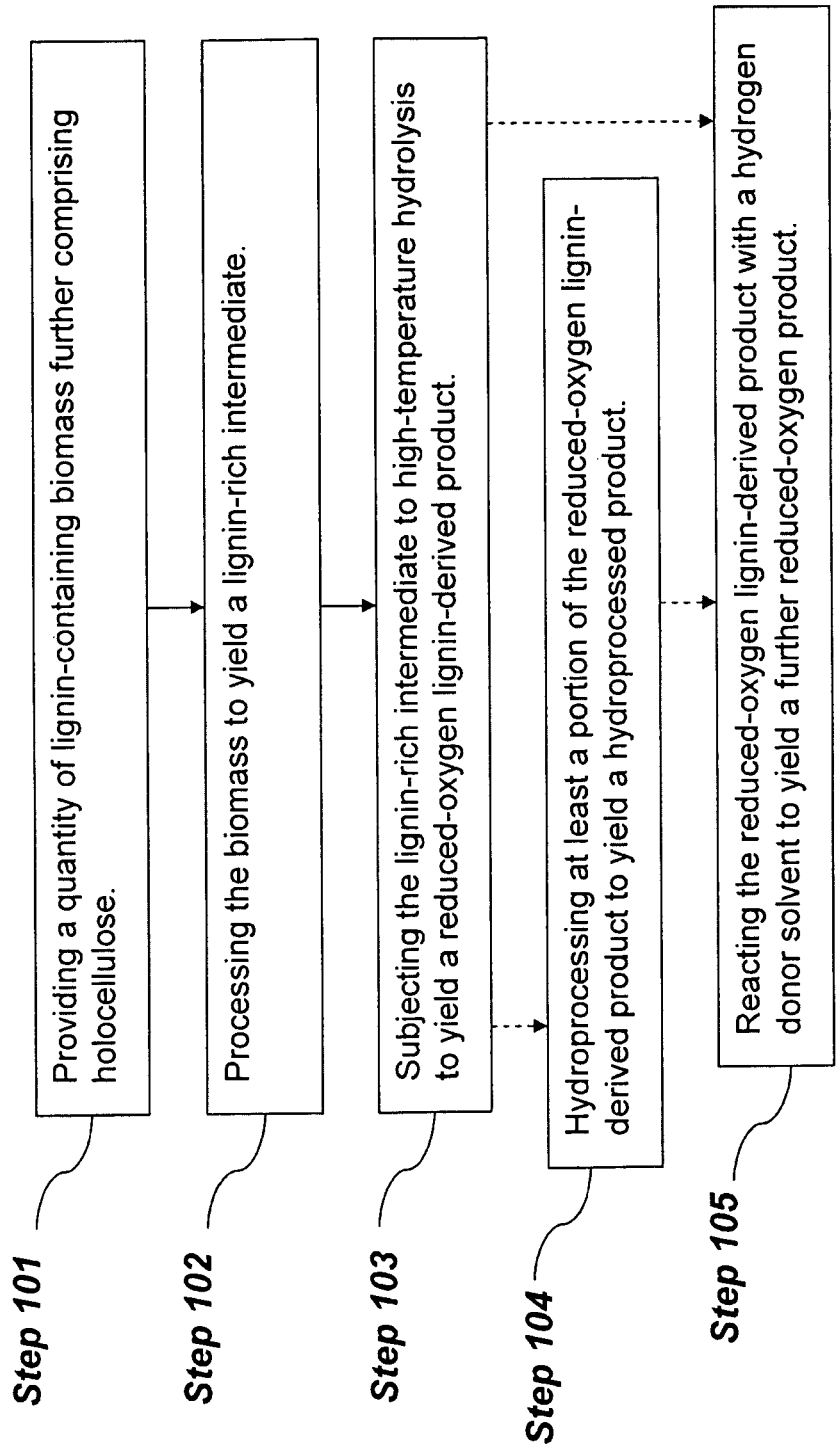
FIG. 1 depicts, in flow diagram form, methods for processing lignin-containing biomass, in accordance with some embodiments of the present invention.

As mentioned above, the present invention is generally directed to methods for processing lignin-containing biomass. Such processing generally reduces the oxygen content of the biomass such that the processed biomass is more amenable to hydroprocessing (e.g., less $H_2$ is needed). Following such processing, such processed biomass can be hydroprocessed to form useable products such as biofuel.

In some embodiments, such above-mentioned methods are integrated with one or more other processes, wherein such other processes may or may not be directed to making biofuels. In some such embodiments, by-product and/or waste streams from the other processes are at least partially utilized as feeds for the processes described herein. In some such embodiments, it is preferable that such integration be of a symbiotic and/or synergistic nature, particularly wherein such integration provides advantages of an economic and/or environmental nature.

1. DEFINITIONS

Certain terms are defined throughout this description as they are first used, while certain other terms used in this description are defined below:

The prefix "bio," as used herein, refers to an association with a renewable resource of biological origin, such resources generally being exclusive of fossil fuels.

"Biofuel," as defined herein, is a fuel product at least partly derived from "biomass," the latter being a renewable resource of biological origin.

"Lignin," as defined herein, is a complex chemical compound most commonly derived from wood and generally being an integral part of the secondary cell walls of plants.

"Cellulose," as defined herein, is essentially a glucose polymer by virtue of it being a linear polysaccharide comprised of from hundreds to thousands of D-glucose monomeric units linked via glycosidic bonds.

"Hemicellulose," as defined herein, can be any of several heteropolysaccharides present in almost all plant cell walls along with cellulose. In contrast to cellulose, hemicellulose is commonly branched, typically shorter in length/molecular weight (a few hundred to a few thousand saccharide units), and contains many different sugar monomers such as, but not limited to, glucose, xylose, mannose, galactose, rhamnose, and arabinose.

The term "holocellulose," as defined herein, refers to the collective content of cellulose and hemicellulose in plant mater.

The term, "lignocellulosic," as defined herein, refers to plant biomass that is composed of cellulose, hemicellulose, and lignin "Hydrolysis" of holocellulose yields sugar (carbohydrate) molecules.

"Hydroprocessing" or "hydrotreating" refers to processes or treatments that react a hydrocarbon-based material with hydrogen, typically under pressure and with a catalyst (hydroprocessing can be non-catalytic). Such processes include, but are not limited to, hydrodeoxygenation (of oxygenated species), hydrotreating, hydrocracking, hydroisomerization, and hydrodewaxing. For examples of such processes, see Cash et al., U.S. Pat. No. 6,630,066; and Elomari, U.S. Pat. No. 6,841,063.

"Transportation fuels," as defined herein, refer to hydrocarbon-based fuels suitable for consumption by vehicles. Such fuels include, but are not limited to, diesel, gasoline, jet fuel and the like.

"Diesel fuel," as defined herein, is a material suitable for use in diesel engines and conforming to the current version of at least one of the following specifications: ASTM D 975—"Standard Specification for Diesel Fuel Oils"; European Grade CEN 90; Japanese Fuel Standards JIS K 2204; The United States National Conference on Weights and Measures (NCWM) 1997 guidelines for premium diesel fuel; and The United States Engine Manufacturers Association recommended guideline for premium diesel fuel (FQP-1A).

The term "biodiesel," as used herein, refers to diesel fuel that is at least significantly derived from a biological source, and which is generally consistent with ASTM International Standard Test Method D-6751. Often, biodiesel is blended with conventional petroleum diesel. B20 is a blend of 20 percent biodiesel with 80 percent conventional diesel. B100 denotes pure biodiesel.

A "conventional refinery," as defined herein, refers to the infrastructure utilized in the processing of petroleum to yield fuels, lubricants, and/or other petrochemical products.

A "Generation 1 (Gen 1) biofuel," as defined herein, is any biofuel whose production adversely impacts the food chain.

A "Generation 2 (Gen 2) biofuel," as defined herein, is any biofuel whose production is independent of the food chain. While terms like "Generation N>2" and "next generation" biofuels are increasingly used in the literature to further define non-food-derived biofuels, for the purposes of this discussion, all such biofuels will be characterized as either Gen 1 or Gen 2.

2. METHODS

Referring to FIG. 1, in some embodiments, the present invention is directed to one or more methods comprising the steps of: (Step 101) providing a quantity of biomass, said biomass comprising a lignin fraction and a holocellulosic fraction; (Step 102) processing the biomass so as to obtain a lignin-rich intermediate, wherein the lignin-rich intermediate comprises a lignin component and a holocellulosic component, wherein the holocellulosic component accounts for not more than 50 weight percent of the lignin-rich intermediate; and wherein the weight percent of the holocellulosic component in the lignin-rich intermediate is less than the weight percent of the holocellulosic fraction in the biomass; and (Step 103) subjecting at least a portion of the lignin-rich intermediate to a high-temperature hydrolysis so as to yield a reduced-oxygen lignin-derived product, wherein said high-temperature hydrolysis is carried out at a temperature of from at least about 220° C. to at most about 300° C., and wherein said reduced-oxygen lignin-derived product has an oxygen content of not more than 25 weight percent on an ash-free basis.

In some such above-described method embodiments, the reduced-oxygen lignin-derived product is a solid at room temperature (i.e., 25° C.).

In some such above-described method embodiments, the step of processing involves a hydrolysis of at least some of the holocellulosic component, and wherein said hydrolysis is carried out at a temperature of less than 220° C. Such hydrolysis treatments are known in the art. See, e.g., Sun et al., "Hydrolysis of lignocellulosic materials for ethanol production: a review," Bioresource Technology, vol. 83, pp. 1-11, 2002. In some such embodiments, such hydrolysis is enzymatically-driven. See, e.g., Wright, "Ethanol from biomass by enzymatic hydrolysis," Chem. Eng. Prog., vol. 84(8), pp. 62-74, 1988. In some such embodiments, this hydrolysis is integrated with another process, wherein the other process is typically directed at something such as ethanol production.

In some such above-described method embodiments, such methods further comprise a step of hydroprocessing (Step 104) at least a portion of the reduced-oxygen lignin-derived product by reacting it with hydrogen to yield one or more hydroprocessed products. Such a hydroprocessing step may itself comprise multiple substeps, and such hydroprocessing can be of any of a variety of methods, some of which are described below.

In some such above-described method embodiments, the step of hydroprocessing involves a hydroprocessing/hydrotreating catalyst and a hydrogen-containing environment. In some such embodiments, such a hydrogen-containing environment can include syngas ($CO+H_2$). For a general review of hydroprocessing/hydrotreating, see, e.g., Rana et al., "A Review of Recent Advances on Process Technologies for Upgrading of Heavy Oils and Residua," Fuel, vol. 86, pp. 1216-1231, 2007. For an example of how triglycerides can be hydroprocessed to yield a paraffinic product, see, e.g., Craig et al., U.S. Pat. No. 4,992,605.

In some such above-described method embodiments, the step of hydroprocessing involves or otherwise utilizes a hydrotreating catalyst comprising an active metal or metal-alloy hydrotreating catalyst component that is operationally integrated with a refractory support material. In some such embodiments, the active metal catalyst component is selected from the group consisting of cobalt-molybdenum (Co—Mo) catalyst, nickel-molybdenum (Ni—Mo) catalyst, noble metal catalyst, and combinations thereof. In these or other embodiments, the refractory support material typically comprises a refractory oxide support such as, but not limited to, $Al_2O_3$, $SiO_2$—$Al_2O_3$, and combinations thereof. In some particular embodiments, the hydroprocessing step makes use of an alumina-supported nickel-molybdenum catalyst. Variation on catalyst type can be used to vary the type of hydrocarbon products produced.

In some such above-described method embodiments, the hydroprocessing is carried out at a temperature between 550° F. and 800° F. In some such embodiments, the hydroprocessing is carried out under a $H_2$ partial pressure of between 400 psig and 2000 psig. In some or other such embodiments, the hydroprocessing is carried out under a $H_2$ partial pressure of between 500 psig and 1500 psig. As with catalyst type, such conditions can play a deterministic role in what types of hydrocarbon products are produced.

In some such above-described method embodiments, such methods further comprise a step of reacting (Step 105) the reduced-oxygen lignin-derived product with a hydrogen donor solvent to form a further reduced-oxygen product having an oxygen content of not more than 10 weight percent on an ash-free basis. In some such embodiments, the hydrogen donor solvent comprises tetralin. In some such embodiments, the hydrogen donor solvent comprises species selected from the group consisting of indanes, phenanthrenes, hyroquinones, and combinations thereof. Note that such reacting can be done in addition to, or in lieu of, the hydroprocessing described above.

In some such above-described method embodiments, the hydrogen donor solvent comprises one or more species recycled from a hydroprocessing step. In some such embodiments, this recycled species is from hydroprocessing at least a portion of the reduced-oxygen lignin-derived product.

In some such above-described method embodiments further comprising a hydroprocessing step, at least a portion of the hydroprocessed product is in the form of an oil, and further comprising a step of transporting said oil to a petroleum refinery for further processing. In some such embodiments, the step of transporting involves a logistical transporting means selected from the group consisting of truck, barge, train, pipeline, and combinations thereof. Accordingly, in some embodiments, methods of the present invention are integrated with logistical infrastructure.

In some such above-described method embodiments further comprising a hydroprocessing step, at least a portion of the hydroprocessed product is in the form of an oil, and wherein said oil is subjected to further processing so as to be at least partially converted to a transportation fuel (vide infra). In some or other such embodiments, at least a portion of the hydroprocessed product is blended with a petroleum-based transportation fuel. Such further processing can include, but is not limited to, additional hydroprocessing, hydrofinishing/hydropolishing, isomerization, and combinations thereof.

In some such above-described embodiments, the lignin-rich intermediate is provided via a by-product stream of another process. As mentioned above, in some such embodiments, the another process is a cellulosic ethanol process. Other suitable processes for providing (directly or indirectly) a lignin-rich intermediate stream include, but are not limited to, paper-making processes, lumber mills, and the like.

In some embodiments, such above-described methods are integrated with one or more aspects of a conventional refinery. In some such embodiments, $H_2$ produced in a conventional refinery is used to hydroprocess the reduced-oxygen lignin-derived product. Additionally or alternatively, the reduced-oxygen lignin-derived product can be hydroprocessed in a conventional refinery.

In some such above-described method embodiments, the high-temperature hydrolysis is carried out under acidic conditions. In some such embodiments, the high-temperature hydrolysis is carried out at a pH of less than 4. In some such embodiments, the high-temperature hydrolysis is carried out at a pH of greater than 2.

In some such above-described method embodiments, the high-temperature hydrolysis is carried out for a period of time (reaction period) ranging from at least 30 seconds to at most 30 minutes. In some embodiments, this time period is limited to 20 minutes; and in some embodiments, this time period is limited to 10 minutes.

In some embodiments, the biomass is subjected to one or more pretreatment steps to render it more processable. Such steps can include mechanical grinding, solvent extraction, milling, cryogenic treatments, combinations thereof and the like. In the case of cryogenic treatments, a particularly useful such treatment involves the cooling of lignocellulosic material down to dry ice ($CO_2$) or even liquid nitrogen temperatures. In some instances, these extremely low temperatures can effect fiber separation, thereby creating more surface area and making subsequent processing more efficient.

In some such above-described method embodiments, wherein the reduced-oxygen lignin-derived product is hydroprocessed to yield a hydroprocessed product, the hydroprocessed product can comprise at least about 25 weight percent $C_6$ to $C_{18}$ hydrocarbons. In some or other such embodiments, the hydroprocessed product will be a biofuel (typically Gen 2, but it could also be Gen 1 or a mixture of the two). In some such embodiments, the biofuel is a transportation fuel such as diesel (e.g., biodiesel). Such hydroprocessed products can also be blended with other fuels and/or products.

3. VARIATIONS

Figure 2:
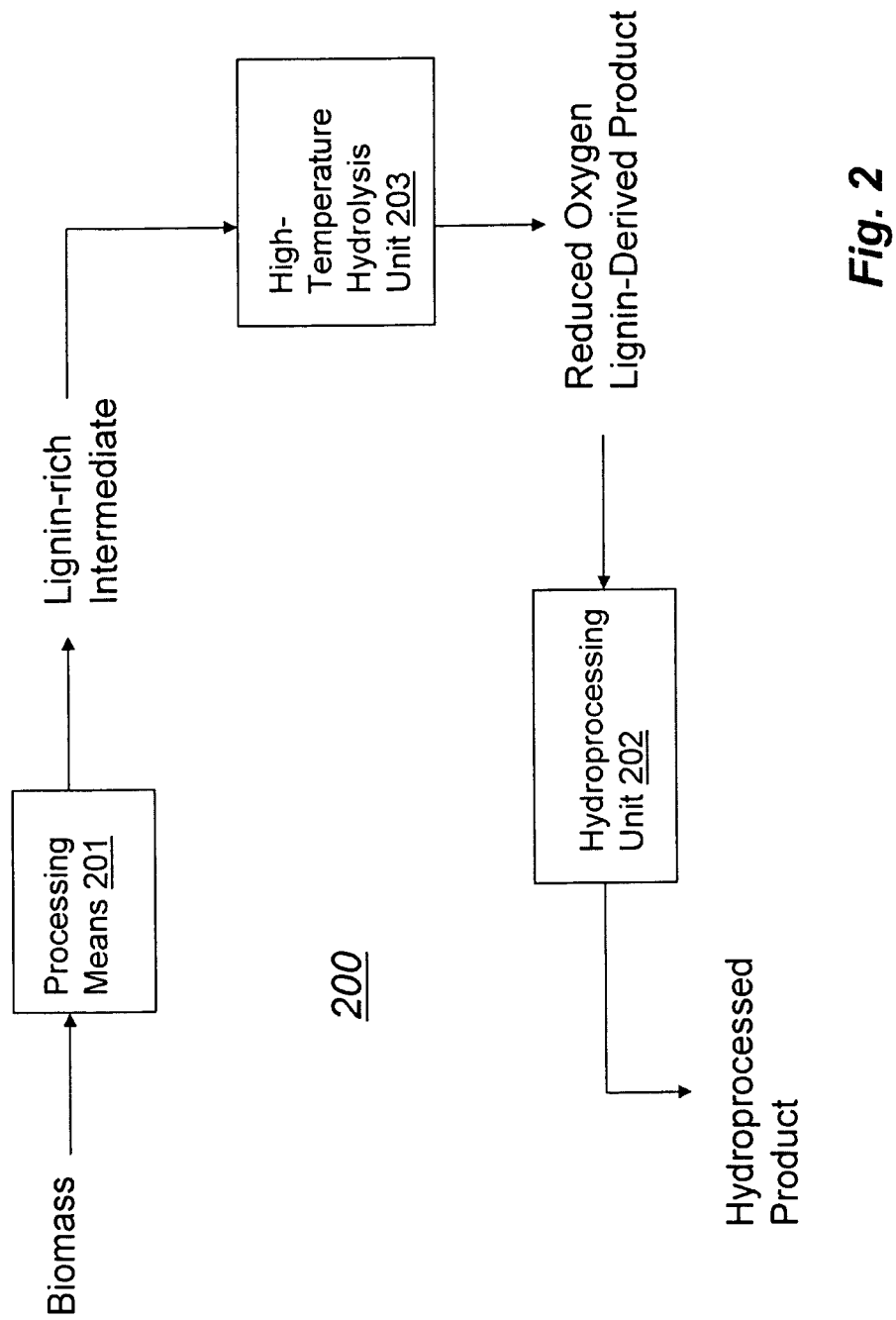
FIG. 2 is a schematic illustrating a system for implementing at least some of the methods illustrated in FIG. 1, in accordance with some embodiments of the present invention.

Referring to FIG. 2, in some or other various embodiments, the present invention is directed to one or more systems for implementing one or more of the above-described methods, such systems 200 comprising: a processing means 201 for processing a biomass, the biomass comprising a lignin fraction and a holocellulosic fraction, so as to obtain a lignin-rich intermediate, wherein the lignin-rich intermediate comprises a lignin component and a holocellulosic component, wherein the holocellulosic component accounts for not more than 50 weight percent of the lignin-rich intermediate; and wherein the weight percent of the holocellulosic component in the lignin-rich intermediate is less than the weight percent of the holocellulosic fraction in the biomass; and a high-temperature hydrolysis unit 203 for subjecting at least a portion of the lignin-rich intermediate to a high-temperature hydrolysis so as to yield a reduced-oxygen lignin-derived product, wherein said high-temperature hydrolysis is carried out at a temperature of from at least about 220° C. to at most about 300° C., and wherein said reduced-oxygen lignin-derived product has an oxygen content of not more than 25 weight percent on an ash-free basis. Typically, processing means 201 will comprise a low-temperature hydrolysis unit, and system 200 will further comprise a hydroprocessing unit 202 for processing the reduced-oxygen lignin-derived product into a hydroprocessed product. Generally, aspects of such systems are complementary to the above-described methods.

In some or other various embodiments, the present invention is directed to lignin-based compositions, wherein such compositions are themselves novel, and wherein such compositions result from at least partial processing as per the above-described methods.

4. EXAMPLES

The following examples are provided to demonstrate particular embodiments of the present invention. It should be appreciated by those of skill in the art that the methods disclosed in the examples which follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

Example 1

This Example serves to illustrate compositional ranges typically seen in biomass feedstocks, in accordance with some embodiments of the present invention.

Figure 3:
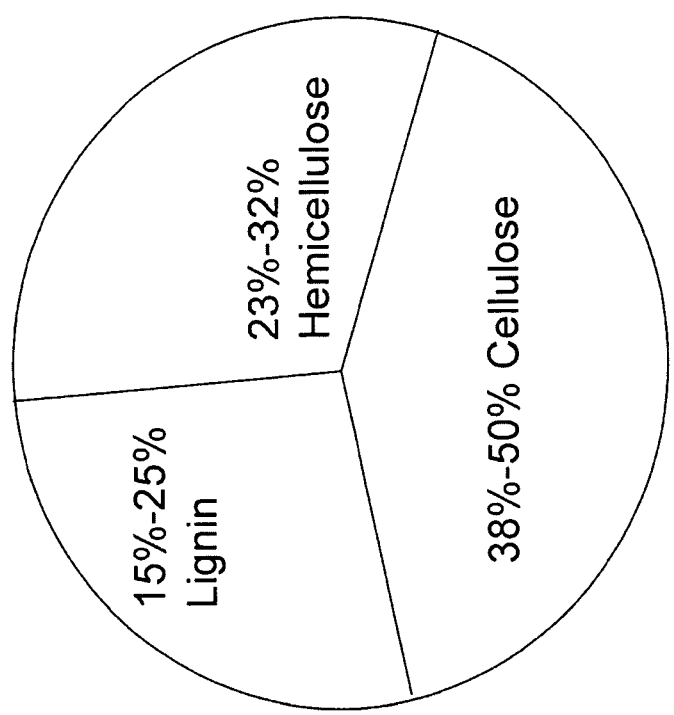
FIG. 3 depicts compositional ranges typically found in biomass feeds, in accordance with some embodiments of the present invention.

As mentioned above, plants from which biomass is derived/utilized comprise three primary constituents: lignin, cellulose, and hemicellulose; wherein cellulose and hemicellulose are collectively referred to as holocellulose. Referring to FIG. 3, typical composition ranges for biomass feeds are 15%-25% lignin, 23%-32% hemicellulose, and 38%-50% cellulose. Where a feed falls in each of these ranges is highly dependent on the plant from which it was sourced or otherwise derived.

Example 2

This Example serves to illustrate how oxygen content varies from one step to the next, as biomass (sorghum in this Example) is processed in accordance with some embodiments of the present invention.

In this Example, untreated sorghum was analyzed for CHNO (carbon, hydrogen, nitrogen, and oxygen; note that oxygen (O) is determined by difference). The untreated sorghum was pretreated by heating ground sorghum at 180° C. in dilute carbonic acid and then isolating the pretreatment solid residue. The pretreatment solid residue was subjected to enzymatic hydrolysis for four days by treatment with a cellulase enzyme (Novozymes Celluclast) loading of ~25-30 filter paper units (FPU)/4 grams wet weight and subsequent isolation of the resulting enzymatic hydrolysis residue. The enzymatic hydrolysis residue then underwent high-temperature hydrolysis by heating in water at 260° C. for 2.5 minutes to yield a reduced-oxygen product. CHNO analysis was additionally carried out on each of the pretreatment residue, enzymatic hydrolysis residue, and reduced-oxygen product. These results are shown in Table 1, FIG. 4, where it can be seen that oxygen content becomes progressively smaller with each successive step.

Example 3

This Example serves to illustrate an exemplary integration of methods/systems of the present invention with ethanol production, in accordance with some embodiments of the present invention.

Figure 5:
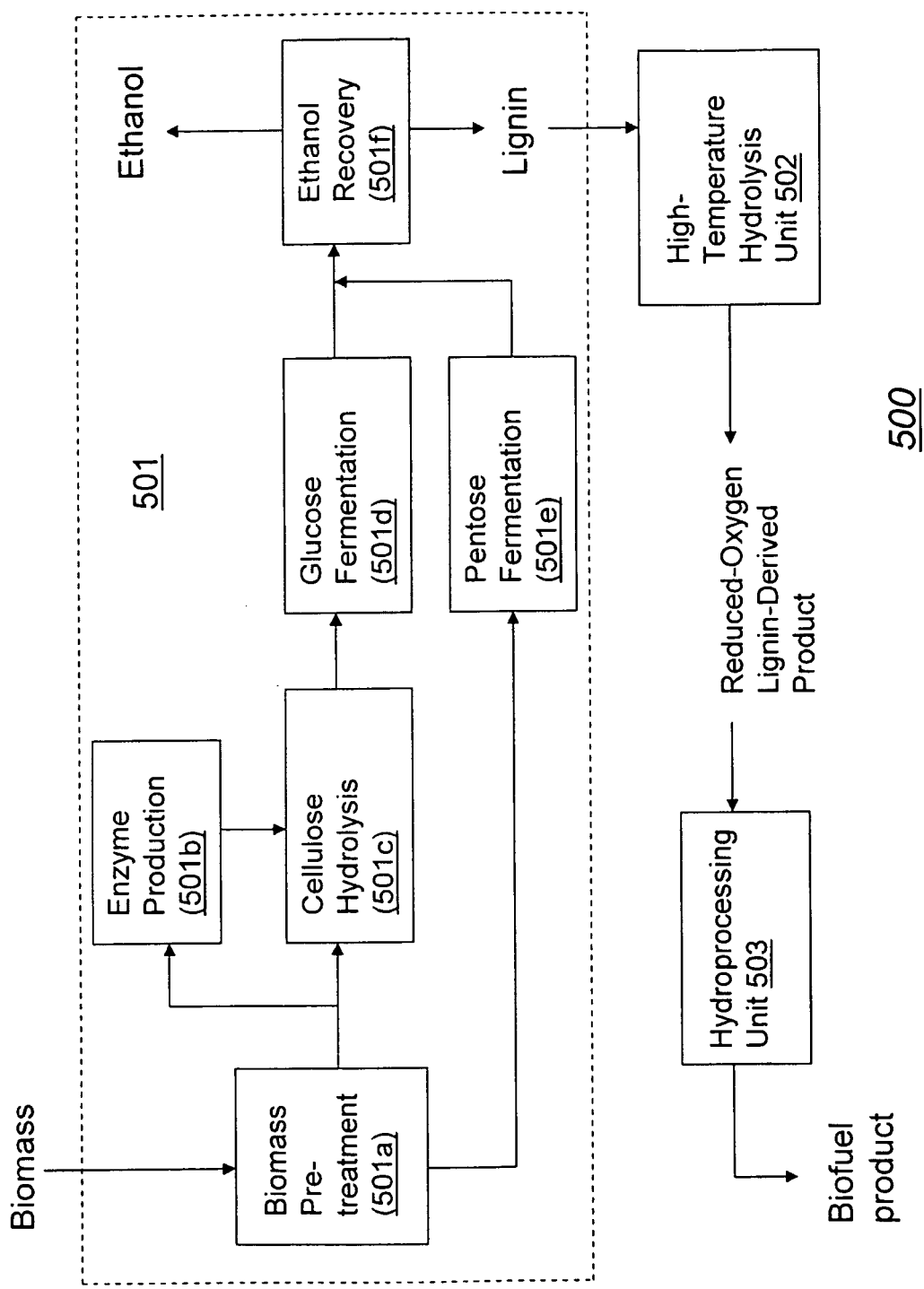
FIG. 5 illustrates an exemplary integration of methods/systems of the present invention with ethanol production, in accordance with some embodiments of the present invention.

Referring to FIG. 5, a biomass processing system 500 of the present invention is integrated with an exemplary bio-ethanol production unit 501. A lignin-containing biomass is first introduced into a bio-ethanol production unit 501 where it undergoes pretreatment (501a), cellulose hydrolysis (501c) that can be enzymatically-driven (501b), glucose (501d) and pentose (501e) fermentation, and ultimately ethanol recovery (501f) which produces a lignin-rich by-product stream. This lignin rich by-product stream is then treated by high-temperature hydrolysis unit 502 where the resulting reduced-oxygen product is then hydroprocessed in hydroprocessing unit 503 to yield one or more biofuel products.

5. CONCLUSION

In summary, the present invention provides for methods to process lignocellulosic (containing lignin+holocellulose) biomass so as to render it more amenable to hydroprocessing, wherein such processing typically reduces the level of oxygen in the biomass. While not intending to be bound by theory, it is believed that during such processing, elements of the holocellulose are condensed with lignin with oxygen loss. Following such processing, the resulting reduced-oxygen lignin-derived product can be hydroprocessed into a biofuel suitable for use as a transportation fuel. Additionally, in some embodiments, such methods can be integrated with one or more other processes, wherein such other processes can be production and/or logistical in nature.

All patents and publications referenced herein are hereby incorporated by reference to the extent not inconsistent herewith. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method comprising the steps of:
   a) providing a quantity of biomass, said biomass comprising a lignin fraction and a holocellulosic fraction;
   b) processing the biomass so as to obtain a lignin-rich intermediate, wherein the lignin-rich intermediate comprises a lignin component and a holocellulosic component, wherein the holocellulosic component accounts for not more than 50 weight percent of the lignin-rich intermediate; and wherein the weight percent of the holocellulosic component in the lignin-rich intermediate is less than the weight percent of the holocellulosic fraction in the biomass; and
   c) subjecting at least a portion of the lignin-rich intermediate to a high-temperature hydrolysis so as to yield a reduced-oxygen lignin-derived product, wherein said high-temperature hydrolysis is carried out under acidic conditions, wherein said high-temperature hydrolysis is carried out at a temperature of from at least about 220° C. to at most about 300° C., and wherein said reduced-oxygen lignin-derived product has an oxygen content of not more than 25 weight percent on an ash-free basis.

2. The method of claim 1, wherein the reduced-oxygen lignin-derived product is a solid at 25° C.

3. The method of claim 1, wherein the step of processing involves a hydrolysis of at least some of the holocellulosic component, and wherein said hydrolysis is carried out at a temperature of less than 220° C.

4. The method of claim 1, further comprising a step of hydroprocessing at least a portion of the reduced-oxygen lignin-derived product by reacting it with hydrogen to yield one or more hydroprocessed products.

5. The method of claim 1, further comprising a step of reacting the reduced-oxygen lignin-derived product with a hydrogen donor solvent to form a further reduced-oxygen lignin-derived product having an oxygen content of not more than 10 weight percent on an ash-free basis.

6. The method of claim 5, wherein the hydrogen donor solvent comprises tetralin.

7. The method of claim 5, wherein the hydrogen donor solvent comprises species selected from the group consisting of indanes, phenanthrenes, hyroquinones, and combinations thereof.

8. The method of claim 5, wherein the hydrogen donor solvent comprises one or more species recycled from a hydroprocessing step.

9. The method of claim 4, wherein at least a portion of the hydroprocessed product is in the form of an oil, and further comprising a step of transporting said oil to a petroleum refinery for further processing.

10. The method of claim 9, wherein the step of transporting involves a logistical transporting means selected from the group consisting of truck, barge, train, pipeline, and combinations thereof.

11. The method of claim 4, wherein at least a portion of the hydroprocessed product is in the form of an oil, and wherein said oil is subjected to further processing so as to be at least partially converted to a transportation fuel.

12. The method of claim 4, wherein at least a portion of the hydroprocessed product is blended with a petroleum-based transportation fuel.

13. The method of claim 1, wherein the lignin-rich intermediate is provided via a by-product stream of another process.

14. The method of claim 13, wherein the another process is a cellulosic ethanol process.

15. The method of claim 1, wherein the high-temperature hydrolysis is carried out at a pH of less than 4.

16. The method of claim 1, wherein the high-temperature hydrolysis is carried out at a pH of greater than 2.

17. The method of claim 1, wherein the high-temperature hydrolysis is carried out for a period of time ranging from at least 30 seconds to at most 30 minutes.

18. A method comprising the steps of:
a) processing a quantity of biomass, said biomass comprising a lignin fraction and a holocellulosic fraction, so as to obtain a lignin-rich intermediate, wherein the lignin-rich intermediate comprises an oxygen content of not less than 30 weight percent on an ash-free basis; and
b) subjecting at least a portion of the lignin-rich intermediate to a high-temperature hydrolysis so as to yield a reduced-oxygen lignin-derived product, wherein said high-temperature hydrolysis is carried out under acidic conditions, wherein said high-temperature hydrolysis is carried out at a temperature of from at least about 220° C. to at most about 300° C., and wherein said reduced-oxygen lignin-derived product has an oxygen content of not more than 25 weight percent on an ash-free basis.

19. The method of claim 18, wherein at least 12 percent of the oxygen content of the lignin-rich intermediate is established via the presence of species selected from the group consisting of cellulose, hemicellulose, oligosaccharides, simple sugars, and combinations thereof.

20. The method of claim 18, further comprising a step of hydroprocessing at least a portion of the reduced-oxygen lignin-derived product by reacting it with hydrogen to yield one or more hydroprocessed products.

21. The method of claim 18, further comprising a step of reacting at least some of the reduced-oxygen lignin-derived product with a hydrogen donor solvent to form a further reduced-oxygen lignin-derived product having an oxygen content of not more than 10 weight percent on an ash-free basis.

22. A method comprising the steps of:
a) providing a quantity of lignin-containing biomass, said biomass comprising an oxygen content of not less than 30 weight percent on an ash-free basis; and
b) subjecting at least a portion of the lignin-containing biomass to a high-temperature hydrolysis so as to yield a reduced-oxygen lignin-derived product, wherein said high-temperature hydrolysis is carried out under acidic conditions, wherein said high-temperature hydrolysis is carried out at a temperature of from at least about 220° C. to at most about 300° C., and wherein said reduced-oxygen lignin-derived product has an oxygen content of not more than 25 weight percent on an ash-free basis.

23. The method of claim 22, wherein at least 12 percent of the oxygen content of the lignin-containing biomass is established via the presence of species selected from the group consisting of cellulose, hemicellulose, oligosaccharides, simple sugars, and combinations thereof.

24. The method of claim 22, further comprising a step of hydroprocessing at least a portion of the reduced-oxygen lignin-derived product by reacting it with hydrogen to yield one or more hydroprocessed products.

25. The method of claim 22, further comprising a step of reacting the reduced-oxygen lignin-derived product with a hydrogen donor solvent to form a further reduced-oxygen lignin-derived product having an oxygen content of not more than 10 weight percent on an ash-free basis.

* * * * *